United States Patent
McCleskey et al.

(10) Patent No.: US 11,209,569 B2
(45) Date of Patent: Dec. 28, 2021

(54) NEUTRON TIME OF FLIGHT WELLBORE LOGGING

(71) Applicant: Weatherford Technology Holdings, LLC, Houston, TX (US)

(72) Inventors: Matthew McCleskey, Anderson, TX (US); Natasa Mekic, Spring, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 296 days.

(21) Appl. No.: 16/460,867

(22) Filed: Jul. 2, 2019

(65) Prior Publication Data

US 2021/0003738 A1 Jan. 7, 2021

(51) Int. Cl.
*G01V 5/10* (2006.01)
*G01T 3/06* (2006.01)

(52) U.S. Cl.
CPC ............. *G01V 5/105* (2013.01); *G01T 3/06* (2013.01); *G01V 5/102* (2013.01); *G01V 5/108* (2013.01)

(58) Field of Classification Search
None
See application file for complete search history.

(56) References Cited

U.S. PATENT DOCUMENTS

| | | |
|---|---|---|
| 3,562,523 A | 2/1971 | Richardson et al. |
| 3,817,328 A | 6/1974 | Neuman |
| 4,191,883 A | 3/1980 | Albright et al. |
| 4,379,228 A | 4/1983 | Allen |
| 4,605,854 A | 8/1986 | Smith, Jr. |
| 5,880,469 A * | 3/1999 | Miller .............. G01T 1/201 250/367 |
| 6,207,953 B1 * | 3/2001 | Wilson .............. G01V 5/104 250/269.4 |
| 6,297,507 B1 | 10/2001 | Chen et al. |
| 7,566,869 B2 | 7/2009 | Riley et al. |
| 9,322,948 B2 | 4/2016 | Ramamoorthy et al. |
| 10,215,880 B1 | 2/2019 | Trcka et al. |
| 2003/0178560 A1 | 9/2003 | Odom et al. |

(Continued)

FOREIGN PATENT DOCUMENTS

RU 2232409 9/2004

OTHER PUBLICATIONS

International Search Report and Written Opinion regarding PCT Application No. PCT/US2020/040147, dated Oct. 15, 2020.

(Continued)

*Primary Examiner* — Hoon K Song
(74) *Attorney, Agent, or Firm* — Lewis & Reese, PLLC

(57) ABSTRACT

Methods and tools for determining one or more parameters of an earth formation using time-of-flight (TOF) measurements of fast neutrons through the formation are disclosed. The disclosed tools feature a neutron source capable of emitting a population of fast neutrons having a distribution of neutron energies and one or more neutron detectors. The TOF of the fast neutrons travelling from the neutron source to the detector(s) and traversing a portion of the formation is measured and binned as a function of TOF (which is a function of neutron energy). By determining which neutron energies are attenuated by the intervening formation, the composition of the intervening formation is determined.

20 Claims, 4 Drawing Sheets

(56) References Cited

U.S. PATENT DOCUMENTS

| | | | |
|---|---|---|---|
| 2008/0156977 A1* | 7/2008 | Jeffryes | E21B 47/11 250/269.6 |
| 2012/0119076 A1* | 5/2012 | Edwards | E21B 47/11 250/269.1 |
| 2013/0188168 A1* | 7/2013 | Hartog | E21B 47/113 356/32 |
| 2015/0346382 A1* | 12/2015 | Bliven | G01T 3/08 250/262 |
| 2016/0349398 A1 | 12/2016 | Zhou et al. | |
| 2019/0187116 A1* | 6/2019 | Mauborgne | G01V 5/102 |
| 2021/0072421 A1* | 3/2021 | Teague | G01V 5/10 |

OTHER PUBLICATIONS

Dangendorf, V. et al., "Detectors for Energy-Resolved Fast Neutron Imaging," Nuclear Instruments and Methods in Physics Research Section A, vol. 535, Dec. 2004, pp. 93-97.

Exerpt from "Detectors That Utilize Fast Neutron Scattering," Chapter 15, retrieved on Mar. 12, 2019, p. 581.

Haight, R.C., "Fast-Neutron Detectors for Nuclear Physics Experiments," IOP Publishing for Sissa MediaLab, 2012, 16 pages.

Middleton, Mike F., "Imaging of Fluid Flow in Porous Rocks by Neutron Radiography," School of Applied Geology—Curtin University of Technology, obtained Nov. 22, 2004, 4 pages.

"Neutron Imaging: A Non-Destructive Tool for Materials Testing," International Atomic Energy Agency, Sep. 2008, 135 pages.

"Neutron Imaging at the Spallation Source SINQ—Information for Potential Users and Customers," Paul Scherrer Institute, 2016, 36 pages.

Vartsky, D et al., "Quantitative Discrimination between Oil and Water in Drilled Bore Cores via Fast-Neutron Resonance Transmission Radiography," Applied Radiation and Isotopes, vol. 118, Dec. 2016, pp. 87-94.

Zhou, Tong, et al., "Fast Neutron Cross-Section Measurement Physics and Applications," SPWLA 57th Annual Logging Symposium, 2016, 19 pages.

\* cited by examiner

NEUTRON TIME OF FLIGHT WELLBORE LOGGING

FIELD OF THE INVENTION

The present application relates to logging of boreholes in oil and gas operations, and more particularly, to time of flight (TOF) measurements using fast neutrons.

BACKGROUND

Wellbore logging is commonly used in petroleum and hydrocarbon drilling and production to assess properties of formations, such as formation lithology, porosity, and pore fluid content. Wellbore logging measurements are performed using logging tools deployed into a wellbore, either by wireline or as part of a drilling string. A number of logging tools and logging methods are based on tools having a neutron source and one or more detectors that measure neutrons and/or radiation elicited by the interaction of neutrons with matter in the formation and/or borehole.

For example, formation porosity can be measured using thermal neutron capture methods. A tool for thermal neutron capture measurements typically includes a neutron source and one or more neutron detectors. The neutron source emits high-energy neutrons that are slowed, mainly by elastic scattering, to near thermal energies (i.e., energies of about the same energy of the surrounding matter, typically less than 0.4 eV). The thermal neutrons diffuse through the surrounding matter until they undergo thermal capture by atoms in the surrounding matter. The slowing of the neutrons is primarily dominated by hydrogen atoms and the capture of the thermal neutrons is primarily dominated by chlorine, hydrogen, and other thermal neutron-capturing atoms. As hydrogen is mainly found in fluids contained in the pores of the formation, the attenuation of the number of neutrons detected by the detectors is an indication of the formation porosity. Tool geometry and modeling techniques can be used to account for factors such as borehole fluid effects, pore fluid composition, and the like.

Other neutron logging techniques involve measuring gamma radiation produced when the neutrons interact with the various types of matter in the formation and/or wellbore. For example, sigma logging can be used, in some situations, to determine fluid saturation of pores (i.e., the amount of water v. the amount of hydrocarbon contained with the pores) within a formation. In sigma logging, a neutron generator is used to produce a pulse of neutrons. After the neutron pulse has stopped, gamma radiation produced by the capture of thermal neutrons is measured. The decay constant of the observed gamma radiation can then be related to the macroscopic thermal neutron capture cross section of the formation and provides an indication of the salinity of the borehole fluid and water/oil saturation.

It should be noted that sigma logging is dependent on formation salinity to measure fluid saturation. In other words, it is difficult, using sigma logging, to determine fluid saturation if the formation water does not contain appreciable chlorine (i.e., fresh water). Another neutron logging technique, C/O logging, measures gamma radiation generated by inelastic scattering interactions with carbon and oxygen to provide information about the ratios of carbon and oxygen (C/O) present in the formation pores. The inelastic scattering interactions of neutrons with carbon and with oxygen each produce gamma photons having characteristic energies. The C/O ratio provides an indication of the ratio of hydrocarbon (having a high C content) and water (having a high O content) contained within the pores of the formation. In C/O logging, gamma radiation is measured during the neutron burst and the energy of the detected gamma photons is used to determine the ratio of gamma photons from inelastic processes on carbon and on oxygen. Since C/O logging does not rely on the presence of chlorine it can be used in fresh water scenarios. However, C/O logging is highly dependent on the matrix of the formation. Also, the fact that C/O gamma measurements are made during the burst of neutrons makes such measurements susceptible to high background noise due to thermal neutron capture gammas.

As both the standard sigma logging and C/O logging techniques involve inherent limitations/complications, as mentioned above, there is a need in the art for further logging techniques for assessing pore fluid content in formations.

SUMMARY

A method of measuring at least one parameter of an earth formation is disclosed herein. According to some embodiments, the method comprises: deploying a logging tool in a wellbore traversing the formation, wherein the logging tool comprises: a neutron source configured to emit fast neutrons, and at least one neutron detector. According to some embodiments, the method comprises measuring a time-of-flight (TOF) of fast neutrons traversing from the neutron source to the at least one neutron detector through a portion of the earth formation, and using the measured TOF to determine the at least one parameter. According to some embodiments, the neutron source is configured to emit a population of neutrons having a distribution of neutron energies. According to some embodiments, the measured TOF is indicative of a neutron energy of the fast neutrons traversing through the portion of the earth formation. According to some embodiments, using the measured TOF to determine the at least one parameter comprises determining an amount of at least one material present in the earth formation based on neutron energies of fast neutrons that are transmitted through or attenuated by the formation. According to some embodiments, the at least one material is selected from the group consisting of hydrocarbons and water. According to some embodiments, the at least one parameter is fluid saturation. According to some embodiments, measuring the TOF of fast neutrons traversing from the neutron source to the at least one neutron detector through a portion of the earth formation comprises: providing a start signal coincident with the neutron source emitting fast neutrons, providing a detect signal coincident with the at least one detector detecting fast neutrons, and determining the TOF as a difference between the detect signal and the start signal. According to some embodiments, the neutron source comprises a neutron generator and a scintillator material configured such that at least a portion of neutrons generated by the neutron generator causes the scintillator material to emit light, and wherein the start signal is triggered by the emitted light. According to some embodiments, the TOF is 5 nanoseconds to 500 nanoseconds. According to some embodiments, the method further comprises determining an attenuation of traversing a sample of wellbore fluid collected from the wellbore. According to some embodiments, measuring the time-of-flight (TOF) of fast neutrons traversing from the neutron source to the at least one neutron detector through a portion of the earth formation comprises: emitting a population of fast neutrons at the neutron source, wherein the population of fast neutrons comprises neutrons having a distribution of neutron energies, providing a start signal coincident with the emitting of the population of fast neutrons, triggering the one or more neutron detectors to begin detecting fast neutrons based on the start signal, and binning neutron detection counts of the at least one detector as a function of time elapsed between the start signal and the counts. According to some embodiments, the method further comprises normalizing the neutron detection counts with respect to a source neutron count comprising a count of the fast neutrons emitted by the neutron source. According to some embodiments, the method further comprises determining a neutron attenuation for selected bins. According to some embodiments, the method further comprises determining a composition of fluid contained within pores of the formation based on the neutron attenuation. Non-transitory computer readable media comprising instructions, which when executed, cause a computer device to perform any of the method steps described above are also disclosed herein.

Also disclosed herein is a logging tool configured to be conveyed in a wellbore traversing an earth formation, the logging tool comprising: a neutron source configured to emit fast neutrons, at least one neutron detector, a trigger circuitry configured to trigger a start signal coincident with the neutron source emitting the fast neutrons, and a timing circuitry configured to measure a time-of-flight (TOF) of the fast neutrons between the neutron source and the at least one detector. According to some embodiments, the neutron source is configured to emit a population of fast neutrons having a distribution of neutron energies. According to some embodiments, the neutron source comprises a neutron generator and a scintillator material configured such that at least a portion of neutrons generated by the neutron generator interacts with the scintillator material to provide the population of fast neutrons having a distribution of neutron energies. According to some embodiments, the interaction of the at least a portion of neutrons with the scintillator material causes the scintillator material to emit light. According to some embodiments, the trigger circuitry is configured to trigger the start signal based on the emitted light. According to some embodiments, the timing circuitry comprises at least one time-to-digital converter (TDC) configured to receive the start signal as a first input and a detection signal from the at least one neutron detector as a second input.

DESCRIPTION

Figure 1:
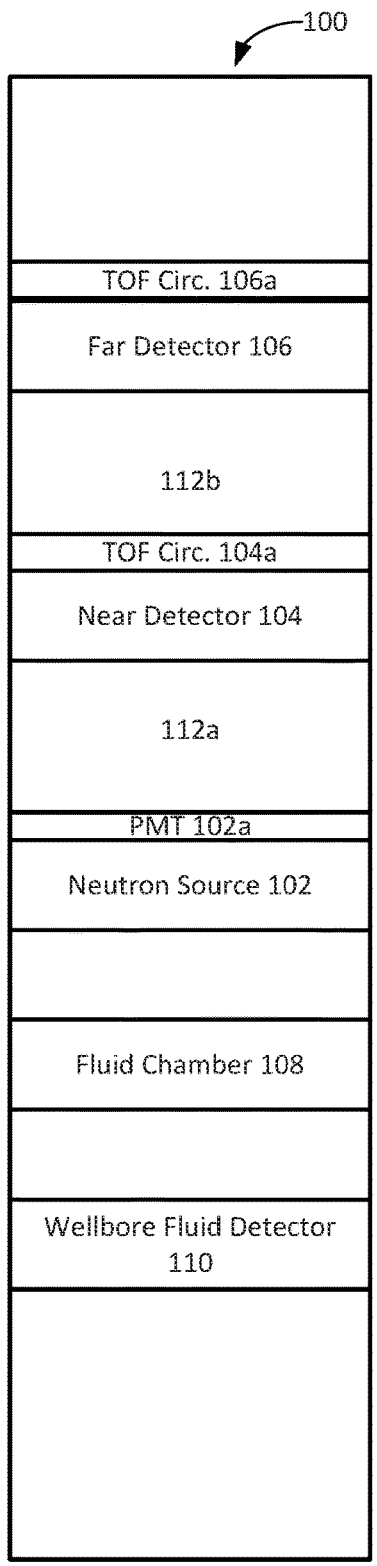
FIG. 1 shows a logging tool according to embodiments of the disclosure.

Aspects of the disclosure relate to new logging tools and logging methods for assessing formation lithology, porosity, and, in particular, fluid content. FIG. 1 schematically illustrates an arrangement of components within a section of a logging tool 100, as described herein. The logging tool 100 is configured to be deployed within a wellbore, either as a part of a drilling string (for MWD/LWD applications) or by wireline or other deployment methodology (slickline, coiled tubing, etc.), as known in the art. The arrangement of the illustrated components of the logging tool 100 is briefly discussed here. The components and their implementation are described in more detail below.

The logging tool 100 includes a neutron source 102. A photomultiplier tube (PMT) 102a or other photodetector (e.g., photodiode) is configured near the neutron source 102. The logging tool 100 includes one or more neutron detectors. For example, the illustrated logging tool 100 includes a near neutron detector 104, a far neutron detector 106, and a wellbore fluid neutron detector 110. The near and far detectors are each configured to interface with time-of-flight circuitry, 104a and 106a, respectively, which will be discussed in more detail below. Various embodiments of the logging tool 100 may include more or fewer neutron detectors than illustrated in FIG. 1. For example, some embodiments do not include a wellbore fluid neutron detector 110.

The neutron detector(s) may be any type of neutron detector known in the art and typically include a PMT and a scintillator material. The arrangement of the one or more neutron detectors may vary according to the specific embodiment and implementation of the logging tool 100. For example, according to some embodiments, the near neutron detector 104 may be about 20 to about 30 cm from the neutron source 102 and the far neutron detector may be about 80 to about 120 cm from the neutron source 102. The intervening sections 112a, 112b, etc. of the logging tool 100 between the neutron source 102 and the neutron detectors (e.g., 104, 106) may comprise shielding material, such as boron nitride, for example, to shield the neutron detectors from neutron flux penetrating through the tool.

It will be appreciated that FIG. 1 is only intended to provide a schematic overview of the logging tool 100. Embodiments of a logging tool 100 also includes components that are omitted from the illustration for the sake of clarity. For example, the logging tool 100 may comprise one or more electronics sections that may include electronics and one or more processors for operating the tool, for receiving and processing responses from the neutron detectors, for controlling the neutron generator, for storing data, and/or for communicating data and instructions between the tool and surface processing/operation equipment and the like.

Figure 2:
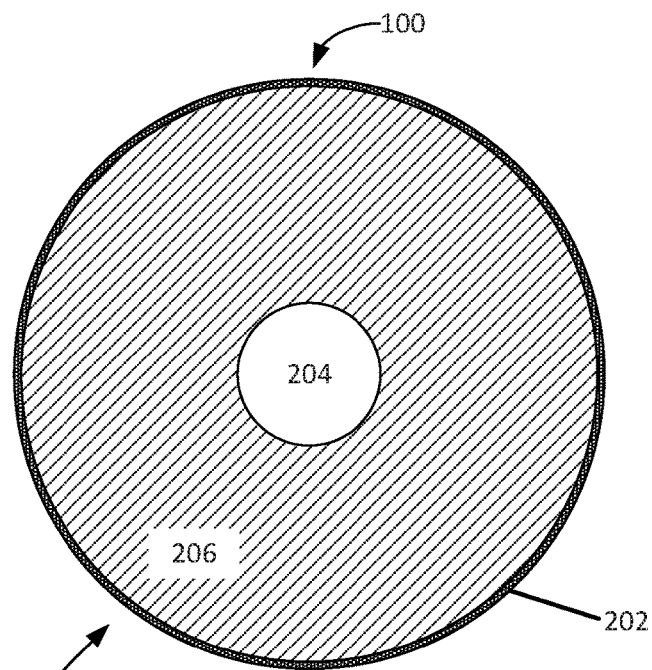
FIG. 2 shows a neutron source according to embodiments of the disclosure.

FIG. 2 illustrates a cross-section view of the logging tool 100 in the section of the tool containing the neutron source 102. As seen in the cross-section view, the logging tool 100 comprises a housing 202, which is typically made of a material such as aluminum. The neutron source 102 comprises a neutron generator 204 surrounded by a scintillator/moderator material 206, The neutron generator 204 is capable of generating pulsed, fast neutrons. As used herein, the term "fast neutrons" refers to neutrons having an energy of 1 to 20 MeV. An example of a neutron generator 204 is a deuterium-tritium (D-T)-based neutron generator, which produces neutrons having an energy of about 14.1 MeV. Examples of suitable scintillator/moderator materials 206 include organic scintillators, such as BC400, BC408, and NE213. The purpose of the scintillator material is two-fold: (1) it moderates the fast neutrons produced by the neutron source, primarily through elastic scattering interactions with hydrogen atoms of the scintillator material; and (2) it produces a light signal (detected at PMT 102a) that serves as a start signal for the time-of-flight (TOF) measurement of neutrons at the neutron detector(s) (104, 106, etc.). The importance of these aspects will be apparent in view of the discussion below.

The logging tool 100 operates to directly measure the time of flight (TCF) of fast neutrons leaving the neutron source 102 and arriving at the detectors 104, 106, etc. When neutrons are generated at the neutron generator 204 some of the neutrons leaving the neutron generator interact with the scintillator/moderator material 206, producing light. The light is sensed at the PMT 102a, which triggers a start signal. Upon triggering of the start signal, the time for fast neutrons to reach the detectors (e.g., 104, 106) is measured. For example, in some embodiments of the logging tool 100, the start signal of the neutron source 102 and the detected signals of the detector(s) are provided as input signals to one or more time-to-digital converters (TDC) to digitize the TOF of the fast neutrons. Such TDC circuitry may be included in the TOF circuitry 104a and/or 106a, for example. It should be pointed out here that the time regime of the TOF measurements is on the order of tens of nanoseconds to possibly a few hundred nanoseconds. For example, the TOF may be from 5 nanoseconds to 500 nanoseconds, or 10 nanoseconds to 200 nanoseconds, or 10 nanoseconds to 100 nanoseconds.

The ability to make such fast and precise TOF measurements is provided, in the illustrated embodiment, by the ability to provide an accurate start signal using the PMT/scintillator material. Such TOF measurements would not be possible using the pulsing structure of conventional electrostatic accelerator neutron sources (without a PMT start measurement or other precise gating setup) because such neutron sources typically operate on the microsecond time scale, much too slowly for the described TOF measurements.

Figure 3:
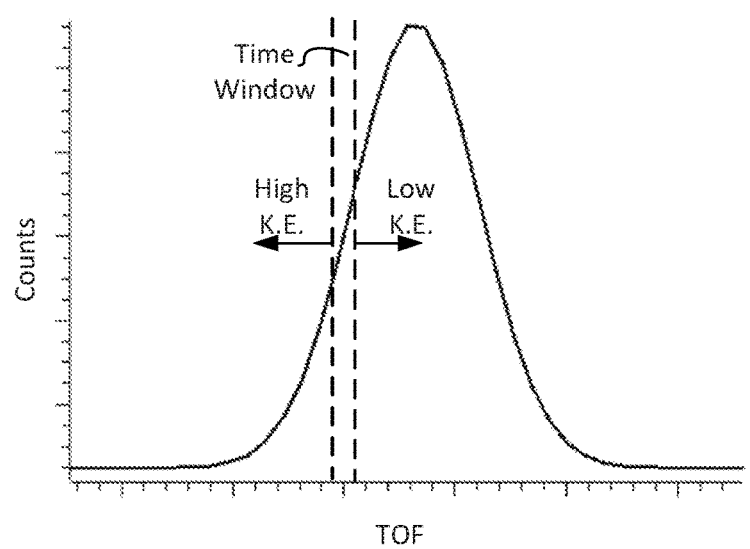
FIG. 3 shows a plot of time-of-flights (TOFs) for a population of neutrons having a distribution of kinetic energies.

As mentioned above, interactions with the scintillator/moderator material 206 also moderates the energies of the neutrons, producing a population of neutrons having a distribution of kinetic energies. In the absence of other variables, and assuming that all of the neutrons take the same path between the neutron source and the detector(s), the time at which the neutrons arrive at the detectors is a function of the kinetic energy of the neutrons. For example, the time of flight $\delta t$ of the neutrons is approximately related to the energy E of the neutrons and the distance traveled $\delta x$, by the equation:

$$\delta t = \frac{\delta x}{v} = \delta x \sqrt{\frac{m}{2E}}$$

where v is the velocity, and in is the mass of the neutron. Therefore, the signals at the detectors indicate a distribution of neutron counts, with the highest energy neutrons arriving first and the lowest energy neutrons arriving last. Thus, by selecting a time window at which to observe counts for the arriving neutrons, one can effectively discriminate/select neutrons as a function of kinetic energy, as shown in FIG. 3. In other words, if the neutron counts at a detector are binned as a function of TOF each bin is representative of different neutron kinetic energies.

The most direct path that neutrons could take between the neutron source 102 and the detectors would be by travelling directly through the tool. However, that path is prevented by the shielding materials within the intervening sections 112a, 112b, etc. Thus, the neutrons must take various other paths, some of which involve the neutrons penetrating into the formation on their way to the detectors. As the neutrons pass through the formation, some of the neutrons will interact with atoms within the formation. If a neutron interacts, then it is less likely to make it to the detector(s).

Figure 4:
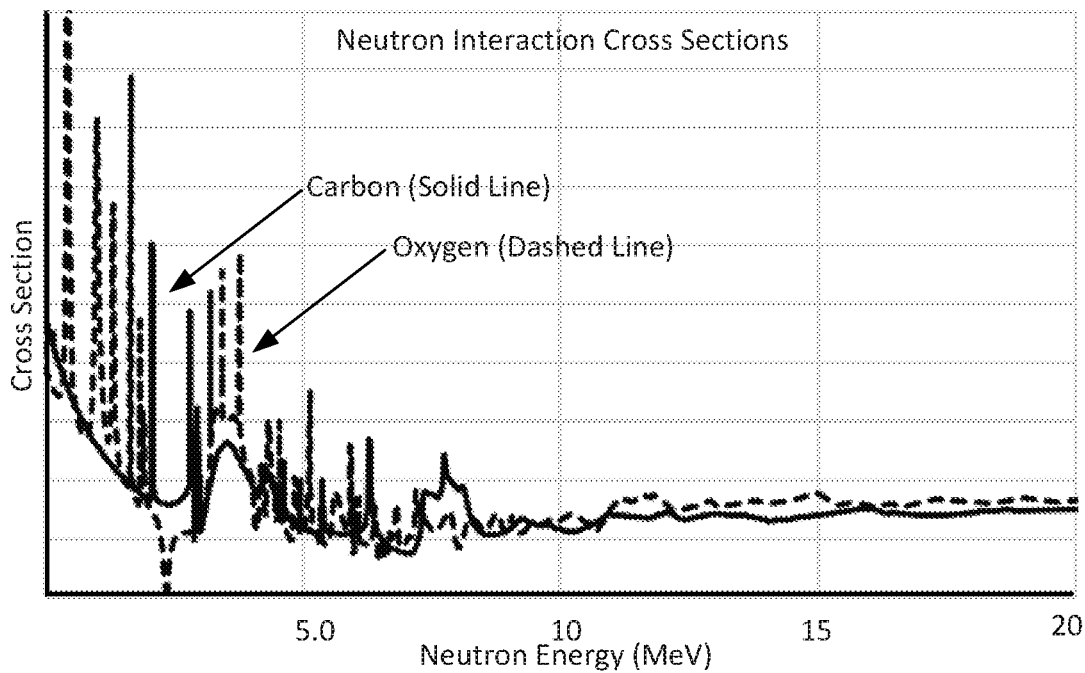
FIGS. 4A & 4B show a plot of neutron interaction cross sections for carbon and oxygen as a function of neutron energy, and mass attenuation coefficients, respectively.
Figure 4:
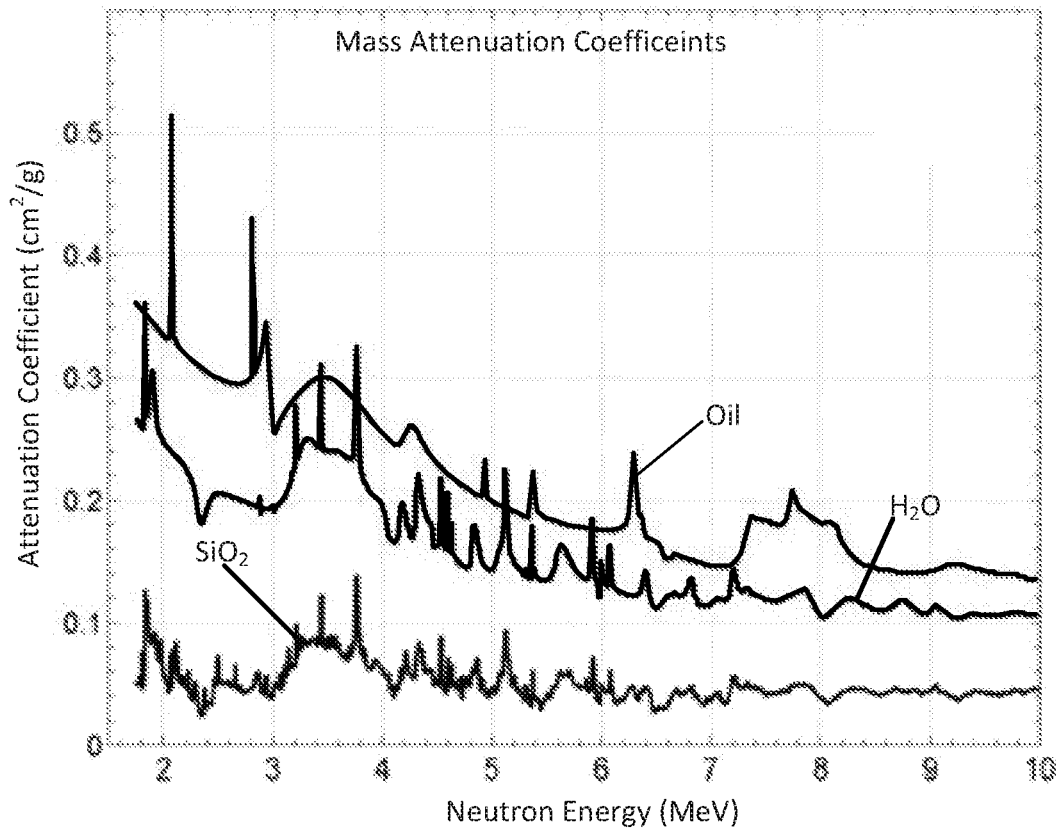

The likelihood that a neutron will interact with the formation is dependent on the energy of the neutron and on properties of the intervening formation. Such formation properties include the porosity of the formation and the interaction cross sections of the various elements contained within the intervening formation. As will be appreciated by a person of skill in the art, an element's neutron interaction cross section is a term used to express the likelihood of interaction between an incident neutron and a target nucleus, An element's neutron interaction cross section is also a function of the energy of the neutron. FIG. 4A illustrates the neutron interaction cross sections of carbon and oxygen as a function of neutron energy. It can be seen that at about 2.5 MeV, oxygen has a minimal neutron interaction cross section, whereas the cross section of carbon at that neutron kinetic energy is higher.

The propensity of a material to interact with (or attenuate) neutrons passing through the material can also be expressed as the material's mass attenuation coefficient (typically expressed in units of $cm^2/g$). FIG. 4B shows the mass attenuation coefficients of silica, oil and water as a function of neutron energy (see Quantitative Discrimination between Oil and Water in Drilled Bore Cores Via Fast-Neutron Resonance Transmission Radiography, Vartsky, et al., Appl. Radiat. Isot., 118:87-94, 2016). The attenuation coefficients of each of the substances show different behavior as a function of neutron energy.

Thus, when an earth sample is subjected to a broad spectral distribution of neutrons, the transmitted neutron spectrum will exhibit dips indicative of the elements that are contained within the sample, which attenuate neutrons at characteristic energies. Accordingly, the energies of neutrons transmitted through the sample (or, conversely, attenuated by the sample) can be used to quantify the materials contained within the sample. Recall that the scintillator/moderator material 206 associated with the neutron source 102 of the logging tool 100 provides neutrons having a distribution of kinetic energies. By gating the time period during which neutrons travelling from the neutron source to the detectors are observed, one can effectively select the kinetic energies of the neutrons being observed. Thus, one can select time bins corresponding to particular kinetic energy regimes that are effective for discriminating between various elements that might be present in the neutron path, such as energies of about 2.5 MeV for discriminating between carbon and oxygen.

Figure 5:
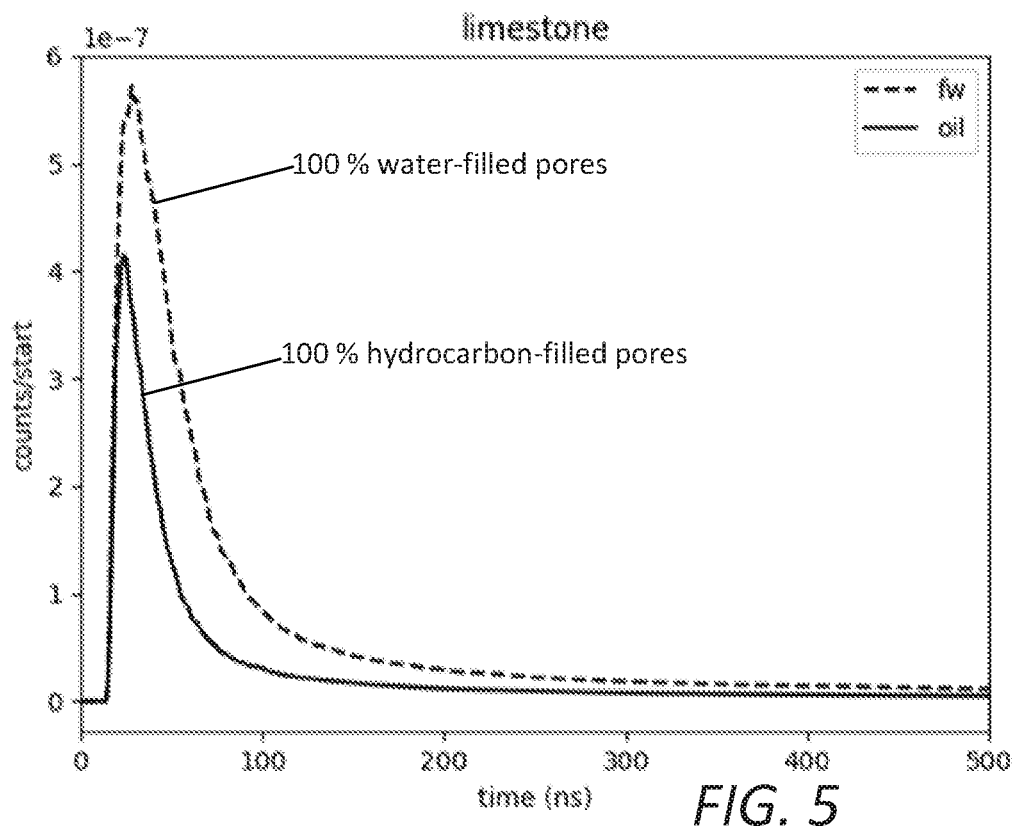
FIG. 5 shows a plot of mass attenuation coefficients for oil and water as a function of neutron energy.
Figure 6:
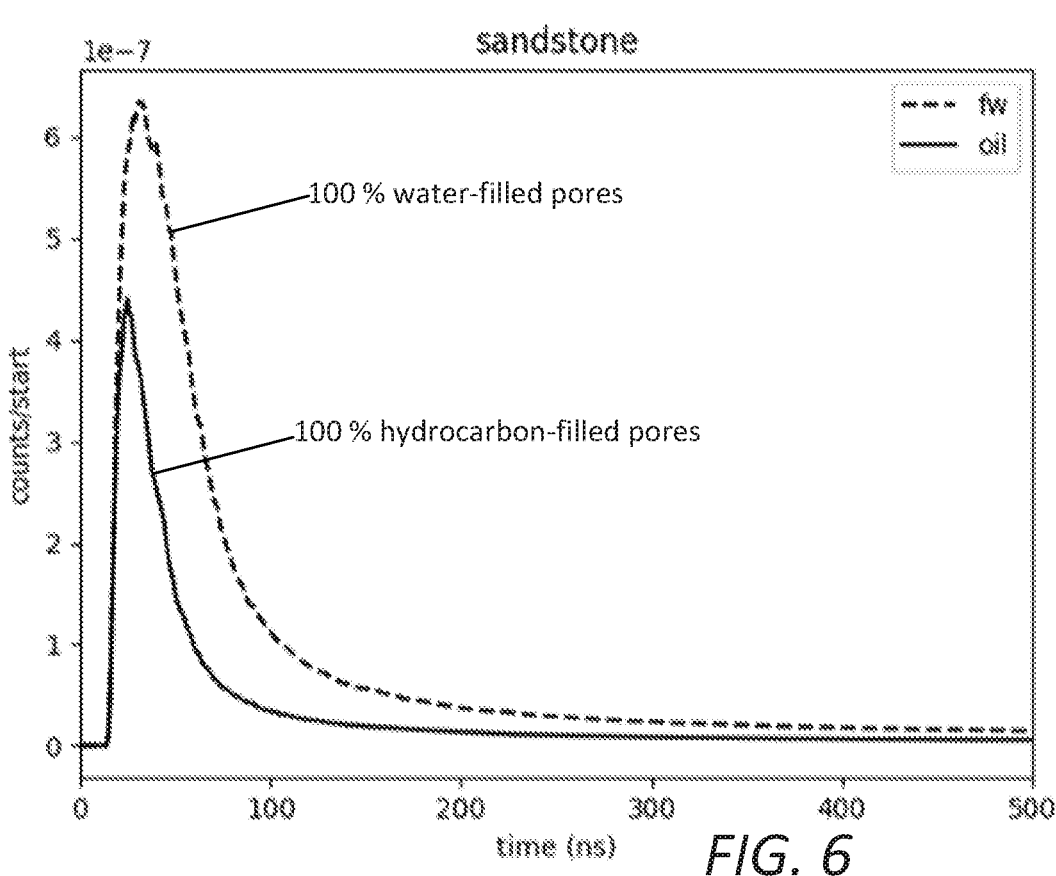
FIG. 6 shows time-of-flight (TOF) measurements in limestone with water-filled pores and with oil-filled pores.

The inventors have discovered that by gating the detector(s) to measure the TOF of the fast neutrons generated at the neutron source, as described above, high sensitivity to hydrocarbons in the pore space of both sandstone and limestone formations can be obtained, with a significant contrast between fresh water-filled and oil filled formations. For example, a logging tool 100 was modeled in hydrocarbon-filled and water-filled limestone and sandstone formations having a porosity of 20 pu. For example, FIG. 5 illustrates results of Monte Carlo modeling of the logging tool 100 in a limestone formation and shows the signal detected at the far detector 106 as a function of time (with time=0 being determined by the PMT 102a associated with the neutron source 102). The signals detected at the far detector are normalized with respect to the neutron count signals detected at the neutron source. It can be seen that the hydrocarbon-filled formation attenuates the neutron signal to a greater extent than does the water-filled formation. As shown in FIG. 6, similar results are obtained in modeled sandstone formations.

As illustrated in FIGS. 5 and 6, neutron TOF measurements using the disclosed logging tool 100 provides significant discrimination between hydrocarbon-filled and water-filled formations, and thus, the logging tool and methods disclosed herein can be used to determine fluid saturation within the formation. It will be appreciated by a person of skill in the art that, to quantify the degree of fluid saturation based on such measurements, the measurements are compared to standards. Such standards may be established by modeling (e.g., Monte Carlo modeling) of tool responses under applicable conditions. Alternatively (or additionally), quantification may be based on measured calibration standards. Also, according to some embodiments, quantification will depend on knowledge of the porosity of the formation being logged. Porosity information may be derived from previous logging. Alternatively, porosity determination may be made during logging using the logging tool 100 using the pulsed neutron source of the logging tool and also measuring thermal neutrons, for example via an additional thermal neutron detector.

It should be appreciated that the saturation measurements provided by the disclosed tools and methods provide advantages over the sigma and C/O logging methods described in the background section above. As explained above, the sigma logging methods depend on thermal neutron capture, which is particularly sensitive to the chlorine content of the formation fluids. Thus, the sigma logging methods may be difficult to implement in low salinity (i.e., fresh water)-bearing formations. By contrast, the presently described methods depend on TOF measurements of fast neutrons (not capture of thermal neutrons), and thus, does not depend on salinity. Thus, the disclosed methods are applicable in both high salinity and low salinity environments, Moreover, the fast time-scale of the disclosed methods avoids the interference of slower time-scale capture gammas, which is a problem with traditional C/O measurements.

As mentioned above, the detectors measurements (e.g., at detectors 104 and 106) are gated based on the start signal provided by the PMT 102a and the time window of the measurements are typically on the order of tens of nanoseconds to a few hundred nanoseconds. The fast time scale of the measurement is particularly suited for measuring the TOF of fast neutrons that take relatively direct routes to between the neutron source and the detector. The time scale of the measurement generally excludes signals arising from slower processes, for example, gamma emission due to neutron capture events in the formation. Such fast time scale measurements are possible with the logging tool 100 because of the very controlled start trigger provided by the PMT 102a. It will be appreciated that other methods of providing very fast, gated neutrons suitable for TOF measurements may be used. For example, the logging tool 100 could be equipped with a linear accelerator for providing neutrons and timing information. Generally, the timing should be provided with a resolution of 10s of nanoseconds.

It will be appreciated that the logging tool 100 allows for the measurement of TOF of fast neutrons travelling through a formation and also allows the user to select particular neutron energies to observe. Thus, a user can select to observe neutron energies optimized to discriminate among various elements that may be present within the formation, for example, to select between carbon and oxygen. Elemental compositions can be quantified based on the TOF measurements by using standards established by modelling and/or measurements calibrated using known formation compositions.

It should be appreciated that background radiation may be an issue with TOF measurements using the logging tool 100. Assume, for example, that the neutron generator 204 generates on the order of $10^8$ neutrons per second and that, of those, on the order of $10^4$ interact with the scintillator material to generate start signals. Many fewer (by orders of magnitude) neutrons will reach the detectors. Moreover, because the time window for detection is designed to be very small (10s-100s of nanoseconds), the number of counts will be correspondingly small. Thus, background radiation must be considered. According to some embodiments, pulse shape discrimination can be used to discriminate between pulses resulting from neutron interactions in the scintillator and gamma interactions, using methods known in the art. According to some embodiments, the detectors may be shielded, for example using lead to shield gamma rays and/or cadmium to shield thermal neutrons.

Materials within the borehole may also interact with neutrons as they travel from the neutron source to the detector. Thus, referring again to FIG. 1, some embodiments of the logging tool 100 includes a fluid chamber 108 configured to contain a sample of wellbore fluid and a wellbore fluid detector 110 configured to measure the attenuation of neutrons passing through the fluid sample contained in the chamber. The measurement of the wellbore fluid attenuation can be used to compensate for the borehole fluid effects that may be present in the measurements made at detectors 104 and/or 106.

Figure 7:
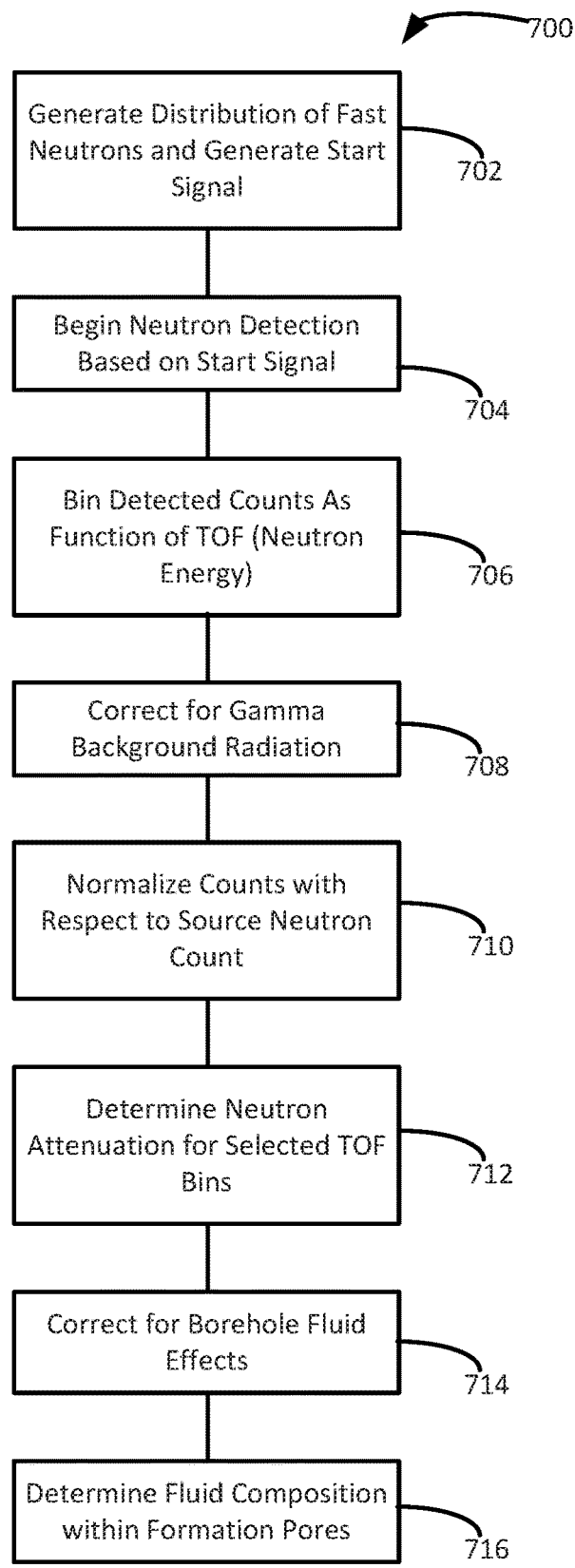
FIG. 7 shows time-of-flight (TOF) measurements in sandstone with water-filled pores and with oil-filled pores.

FIG. 7 illustrates an embodiment of a method for determining the composition of fluid within pores of a formation penetrated by a borehole using a logging tool 100. Fast neutrons are generated 702 using neutron source 102. As explained above, the neutron source 102 is capable of providing neutrons having a distribution of energies, for example, via interaction with a scintillation material surrounding a neutron generator. As also explained above, the generation of neutrons also provides a precisely controlled start signal.

Neutron detection using one or more neutron detectors (e.g., detectors 104, 106) is initiated 704 based on the start signal. Detection signals at one or more detector(s) are recorded as a function of time based on the start signal to measure the TOF of neutrons arriving at the detector(s). Generally, closer detector(s) will have more counts but will be less sensitive to the formation. By comparing a near and a far detector, one could use this information to correct for borehole effects, according to some embodiments.

As mentioned above, the start signal of the neutron source 102 and the detected signals of the detector(s) may be provided as input signals to one or more time-to-digital converters (TDC) to digitize the TOF of the fast neutrons as a function of their detection time relative to the start signal.

The neutron counts at each of the detectors are binned as a function of their TOF 706. The neutron TOF is directly related to the kinetic energy of the neutron. Thus, the TOF binning effectively discriminates among neutrons having different kinetic energies, with the highest energy neutrons arriving to the detector(s) first. The time regime of the neutron measurements is on the order of 10s to a few 100s of nanoseconds, and thus, the measured counts are indicative of fast neutrons travelling from the neutron source to the detector. The time scale of the measurement minimizes counts associated with slower processes, such as neutron capture.

According to some embodiments, the counts detected at the gamma detector(s) are corrected for background gamma radiation and other interfering radiation 708. For example, according to some embodiments, pulse shape discrimination can be used to correct for background radiation. The counts are normalized with respect to the source neutron count 710.

For selected TOF bins (i.e., selected neutron energies), the attenuation of the neutrons is determined 712. As explained above, the extent of attenuation is indicative of both the amount and the composition of matter through which the neutron beam is transmitted. The interaction cross section (and/or mass attenuation coefficient) of each element is characteristic of that element and is a function of neutron energy. By selecting particular TOF bins, it is possible to select neutron energies that are preferentially attenuated by some elements and not by others. Thus, such bins are useful for discriminating between various elements that are present in the neutron path and for quantifying those elements.

As will be appreciated by those of skill in the art, an object of some embodiments described herein is to provide a quantification of fluids (e.g., water, hydrocarbons, etc.) contained within the pores of a formation traversed by a borehole. Such information is provided by the attenuation of the neutrons transmitted through the pores of the formation. However, the neutrons are also transmitted through the borehole itself and substances within the borehole (i.e., borehole fluids, including water, drilling muds, oils, etc.) will also attenuate the transmitted neutrons. Thus, some embodiments of the disclosed method include correcting for attenuation effects due to borehole fluids 714. As described above, some embodiments of the disclosed logging tool 100 include a fluid chamber 108 configured to contain a sample of borehole fluids so that the neutron attenuation by to the sampled borehole fluid can be determined using a wellbore fluid detector 110 (i.e., a neutron detector configured to measure neutron attenuation by the borehole fluid contained within the fluid chamber). The measurements of the borehole fluid neutron attenuation can be used to correct for borehole fluid effects. Based on the determined attenuation, corrected as described above, the composition of fluid(s) in the formation pores can be determined 716.

Generally, a logging tool 100 will be conveyed through a borehole traversing one or more earth formations, as described above, and measurements according to the method 700 will be performed at various depths. The results of measurements can be displayed as a well log, as is known to those skilled in the art.

Some portions of the detailed description were presented in terms of processes, methods, programs and workflows. These processes, methods, programs and workflows are the means used by those skilled in the data processing arts to most effectively convey the substance of their work to others skilled in the art. A process or workflow is here, and generally, conceived to be a self-consistent sequence of steps (instructions) contained in memory and run or processing resources to achieve a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "receiving," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer, selectively activated or reconfigured by a computer program stored in the computer. Such a computer program may be stored in a non-transitory computer readable storage medium, which could be, but is not limited to, any type of disk including floppy disks, optical disks, CD-ROMs, an magnetic-optical disks, read-only memories (ROMs), random access memories (RAMO, EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor, or may be architectures employing multiple processor designs for increased computing capability.

While the invention herein disclosed has been described in terms of specific embodiments and applications thereof, numerous modifications and variations could be made thereto by those skilled in the art without departing from the scope of the invention set forth in the claims.

What is claimed is:

1. A method of measuring at least one parameter of an earth formation, the method comprising:
   deploying a logging tool in a wellbore traversing the formation, wherein the logging tool comprises: a neutron source configured to emit fast neutrons, and at least one neutron detector,
   using the neutron source to emit fast neutrons into the formation,
   using the at least one neutron detector to detect neutrons arriving at the detector,
   measuring a time-of-flight (TOF) of fast neutrons traversing from the neutron source to the at least one neutron detector through a portion of the earth formation, and
   using the measured TOF to determine the at least one parameter.

2. The method of claim 1, wherein the neutron source is configured to emit a population of neutrons having a distribution of neutron energies.

3. The method of claim 1, wherein the measured TOF is indicative of a neutron energy of the fast neutrons traversing through the portion of the earth formation.

4. The method of claim 3, wherein using the measured TOF to determine the at least one parameter comprises determining an amount of at least one material present in the earth formation based on neutron energies of fast neutrons that are transmitted through or attenuated by the formation.

5. The method of claim 4, wherein the at least one material is selected from the group consisting of hydrocarbons and water.

6. The method of claim 1, wherein the at least one parameter is fluid saturation.

7. The method of claim 1, wherein measuring the TOF of fast neutrons traversing from the neutron source to the at least one neutron detector through a portion of the earth formation comprises:
providing a start signal coincident with the neutron source emitting fast neutrons,
providing a detect signal coincident with the at least one detector detecting fast neutrons, and
determining the TOF as a difference between the detect signal and the start signal.

8. The method of claim 7, wherein the neutron source comprises a neutron generator and a scintillator material configured such that at least a portion of neutrons generated by the neutron generator causes the scintillator material to emit light, and wherein the start signal is triggered by the emitted light.

9. The method of claim 1, wherein the TOF is 5 nanoseconds to 500 nanoseconds.

10. The method of claim 1, further comprising determining an attenuation of traversing a sample of wellbore fluid collected from the wellbore.

11. The method of claim 1, wherein measuring the time-of-flight (TOF) of fast neutrons traversing from the neutron source to the at least one neutron detector through a portion of the earth formation comprises:
emitting a population of fast neutrons at the neutron source, wherein the population of fast neutrons comprises neutrons having a distribution of neutron energies,
providing a start signal coincident with the emitting of the population of fast neutrons,
triggering the one or more neutron detectors to begin detecting fast neutrons based on the start signal, and
binning neutron detection counts of the at least one detector as a function of time elapsed between the start signal and the counts.

12. The method of claim 11, further comprising normalizing the neutron detection counts with respect to a source neutron count comprising a count of the fast neutrons emitted by the neutron source.

13. The method of claim 12, further comprising determining a neutron attenuation for selected bins.

14. The method of claim 13, further comprising determining a composition of fluid contained within pores of the formation based on the neutron attenuation.

15. A logging tool configured to be conveyed in a wellbore traversing an earth formation, the logging tool comprising:
a neutron source configured to emit fast neutrons,
at least one neutron detector configured to detect neutrons arriving at the detector,
a trigger circuitry configured to trigger a start signal coincident with the neutron source emitting the fast neutrons, and
a timing circuitry configured to measure a time-of-flight (TOF) of the fast neutrons between the neutron source and the at least one detector.

16. The logging tool of claim 15, the neutron source is configured to emit a population of fast neutrons having a distribution of neutron energies.

17. The logging tool of claim 16, wherein the neutron source comprises a neutron generator and a scintillator material configured such that at least a portion of neutrons generated by the neutron generator interacts with the scintillator material to provide the population of fast neutrons having a distribution of neutron energies.

18. The logging tool of claim 17, wherein the interaction of the at least a portion of neutrons with the scintillator material causes the scintillator material to emit light.

19. The logging tool of claim 18, wherein the trigger circuitry is configured to trigger the start signal based on the emitted light.

20. The logging tool of claim 19, wherein the timing circuitry comprises at least one time-to-digital converter (TDC) configured to receive the start signal as a first input and a detection signal from the at least one neutron detector as a second input.

* * * * *